(12) United States Patent
Erbar et al.

(10) Patent No.: US 6,445,424 B1
(45) Date of Patent: Sep. 3, 2002

(54) METHOD AND APPARATUS FOR MULTISTANDARD VIDEO DATA ACQUISITION

(75) Inventors: Maximilian Erbar, Villingen-Schwenningen; Jinan Lin, Ottobrun, both of (DE)

(73) Assignee: Deutsche Thomson-Brandt Gmbh, Villingen-Schwenningen (DE)

( * ) Notice: Subject to any disclaimer, the term of this patent is extended or adjusted under 35 U.S.C. 154(b) by 0 days.

(21) Appl. No.: 09/335,459

(22) Filed: Jun. 17, 1999

(30) Foreign Application Priority Data

Jun. 26, 1998 (EP) .............................. 98111791

(51) Int. Cl.⁷ .............................. H04N 3/27; H04N 5/46
(52) U.S. Cl. ...................................... 348/554; 348/555
(58) Field of Search ................................ 348/460, 461, 348/463, 464, 465, 467, 468, 473, 474, 558, 554, 555; H04N 3/27, 5/46

(56) References Cited

U.S. PATENT DOCUMENTS

| 4,577,227 A | | 3/1986 | Gurumurthy | 358/147 |
| 4,891,703 A | * | 1/1990 | Noudan | 348/460 |
| 4,908,707 A | * | 3/1990 | Kinghorn | 348/460 |
| 5,555,025 A | | 9/1996 | McArthur | 348/478 |
| 5,850,266 A | * | 12/1998 | Gimby | 348/465 |

OTHER PUBLICATIONS

James, S., *New Devices for VCR Control Using Teletex Services*, IEEE Transactions on Consumer Electronics, vol. 38, No. 3, Aug. 1, 1992, XP000311856, pp. 288–295.

Jinan, Lin et al., *A Digital High-performance Multi-standard Video Data Slicer*, IEEE Transactions on Consumer Electronics, Aug. 1998, IEEE, USA, vol. 44, No. 3, XP002084470, pp. 1103–1106.

Philips Semiconductors, *Semiconductors for Television and Video Systems*—80/83C528 to IDA2555; TDA2557 1995, Eindohoven, Philips, NL XP002084221, pp. 896–927.

* cited by examiner

Primary Examiner—Michael H. Lee
(74) Attorney, Agent, or Firm—Joseph S. Tripoli; Joseph J. Laks; Ronald H. Kurdyla

(57) ABSTRACT

For the acquisition of multistandard video data a decoder is used with a register 201 having 24 cells for storing 3 times 8 bit of data. Each of the three bytes are connected with logical devices in order to compare the content of the cells with given start codes. Start of the register 202 is byte3, followed by byte2 and byte 1. In addition a second 8 bit register 202 is connected in parallel to the register 201. The content of byte3 is also fed to a Hamming (8/4) decoder 203 and of byte2 to a Hamming (8/4) decoder 204. Each decoder output of 4 bits is fed to the assigned 4 bits of the register 202, respectively.

10 Claims, 4 Drawing Sheets

METHOD AND APPARATUS FOR MULTISTANDARD VIDEO DATA ACQUISITION

FIELD OF THE INVENTION

The invention relates to a method and to an apparatus for acquisition of multistandard video data.

BACKGROUND OF THE INVENTION

Existing video data slicers are capable of digitizing incoming signals of different video systems and data services. They provide serial digital data and a clock signal for synchronous data transfer. This data has to be searched for valid start codes of a specific service or of several services in parallel.

Conventional video data acquisition circuits only search the serial data stream for the occurance of specific start codes related to a single service. The "integrated video input processors" (SAA5281 by Philips) for more than one service is restricted to a specific video system (625 lines) and uses different single-standard acquisition circuits in parallel.

SUMMARY OF THE INVENTION

It is an object of the invention to disclose a method for the acquisition of multistandard video data. This object is achieved by the method disclosed in claim 1.

It is a further object of the invention to disclose an apparatus which utilises the inventive method. This object is achieved by the apparatus disclosed in claim 8.

Advantageous additional embodiments of the inventive method and apparatus are disclosed in the respective dependent claims.

According to the invention for acquisition of multistandard video data an incoming data stream is loaded into a first memory and a parallel search for different start codes on the same data containing for different services different framing codes is performed, when service in actual video line is not specified and those start codes looked for are changeable by configuration.

The decoder is controlled by a microprocessor. Advantageously the decoder can be enabled or disabled by the microprocessor via an enable signal.

The clock frequency of the decoder is adapted to the frequency of the different start codes.

Further, a service selection block determines what kind of framing code is looked for based on the line number of a given input signal, the used standard of that input signal and the availability of a certain code in a specific line of that input signal.

Advantageously within an active interval of a service specific timing signal, generated by a search window generator from a horizontal synchron signal, up to 3 bytes are scanned for the appropriate framing code.

In principle 3 bytes are dedicated to the framing code of a line containing a first WSS signal that contains 24 elements based on 5 MHz. In the case of a line containing a second VPS signal, only 2 bytes are compared to the start code consisting of the two bytes based on 5 MHz. In the case of a line containing a third signal like Close Caption only 1 byte is simultaneously compared to both start codes based on 1007 kHz. In the case of a line containing a fourth WST signal, again only one byte has to be compared to the framing code based on 6.9375 MHz, and when the start code is detected during the active search window, the activated signal starts the data transmission to the buffer which is managed by an output control block.

In the case of a line containing the second VPS signal beside the activated signal another signal is exported to a microprocessor register to indicate the reception of that data in a certain line.

In the case of a line containing the fourth WST signal, the two byte following the framing code of that fourth WST signal are decoded during the search and the result is loaded in parallel to a second memory and when the framing code of that fourth WST signal is detected, the data are transferred to the buffer through this memory.

In principle the inventive apparatus for acquisition of multistandard video data includes:
   means for providing start codes;
   means for storing incoming data stream;
   means for comparing said start codes with said incoming data streams.

Further the apparatus may include additionally means for decoding and storing said incoming data stream.

The application of the digital acquisition implemented here is, of course, not only limited to the acquisition of data services in video signals. It can also be used in any other product of digital signal transmission or processing, where different data services occupy time intervals on a shared transmission channel and may occur deterministically or non-deterministically.

BRIEF DESCRIPTION OF THE DRAWINGS

Embodiments of the invention are described with reference to the accompanying drawing, which show in.

DETAILED DESCRIPTION OF PREFERRED EMBODIMENTS

Figure 1:
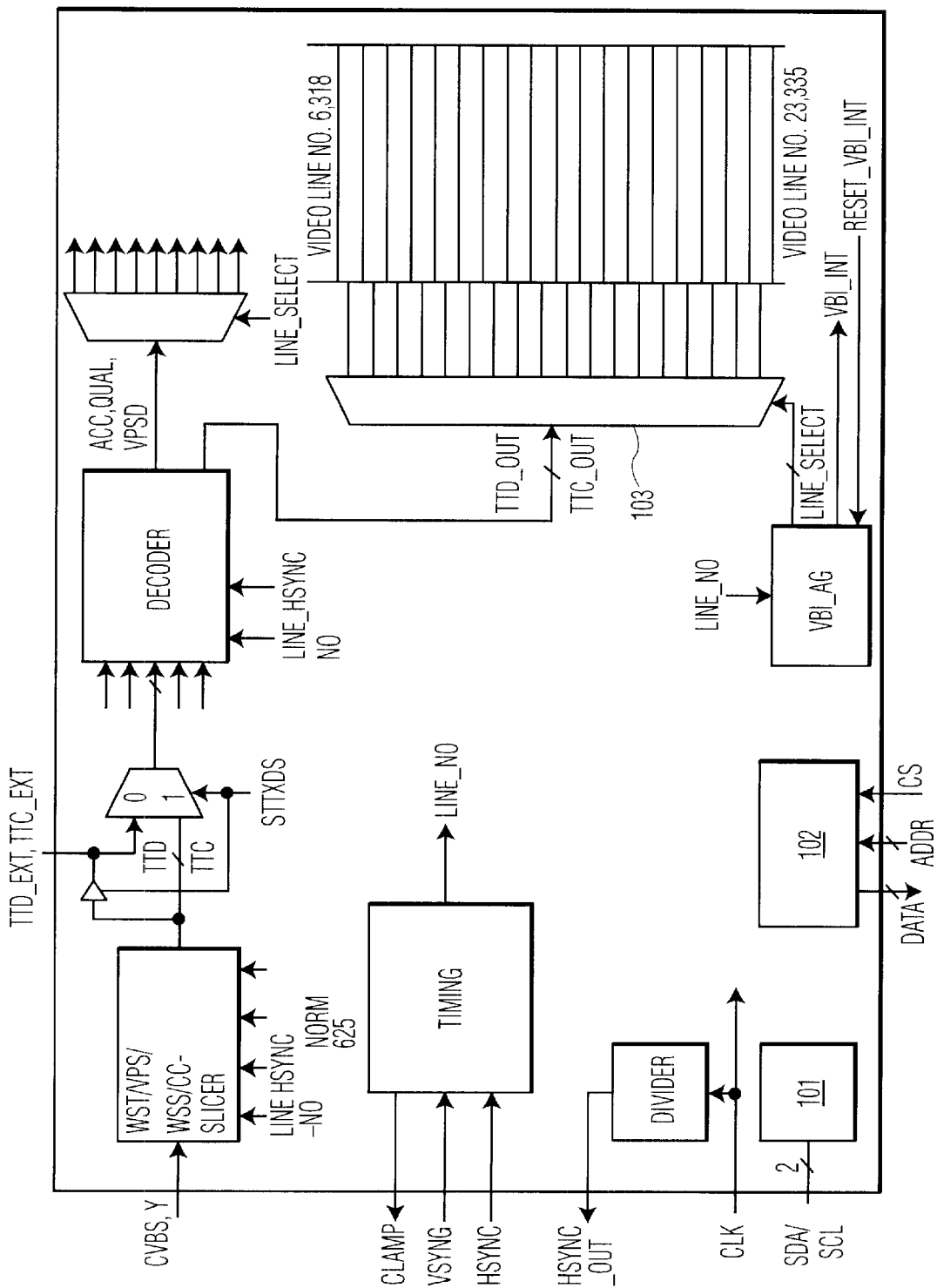
FIG. 1 Block diagram of a digital acquisition IC
FIG. 2 Block diagram of the decoder
FIG. 3 Service selection block decoder
FIG. 4 Search window generator
FIG. 5 Signal timing for the search window
FIG. 6 Output control block
FIG. 7 a Hamming (8/4) decoder

FIG. 1 shows a block diagram of a digital acquisition IC. The IC contains a timing circuit, to which vertical and horizontal synchron pulses VSYNC, HSYNC are fed and signals CLAMP, LINE_NO are generated. It contains further an I2C-bus interface 101, a memory interface 102, a VBI address generator VBI_AG, a slicer, a decoder and a VBI buffer.

The digital acquisition provides the data delivered in the VBI of video signals to a microprocessor. If an internal digital slicer is used, the slicer scans the incoming CVBS or Y signal for the data multiplexed into the video stream. It delivers the extracted data in a similar format as it is used by external teletext slicers. Therefore, the microprocessor can easily select from which data source the data will be taken. But this data that is already in digital format may also contain sliced video data. A decoder block is therefore used to detect valid data with respect to the actually expected data service like e. g. WST or VPS. This data will than be stored into a VBI buffer that is mapped into the microprocessor's memory. The memory size is specified large enough to contain the data of one complete VBI. Hence, the microprocessor has approx. 19 ms time to process the VBI data before the buffer is refilled. Each video line in the VBI has a dedicated VBI buffer line. In addition, each line has two register bits that indicate the line's reception quality. A VBI address generator controls the correct addressing of the buffer lines and registers.

Figure 2:
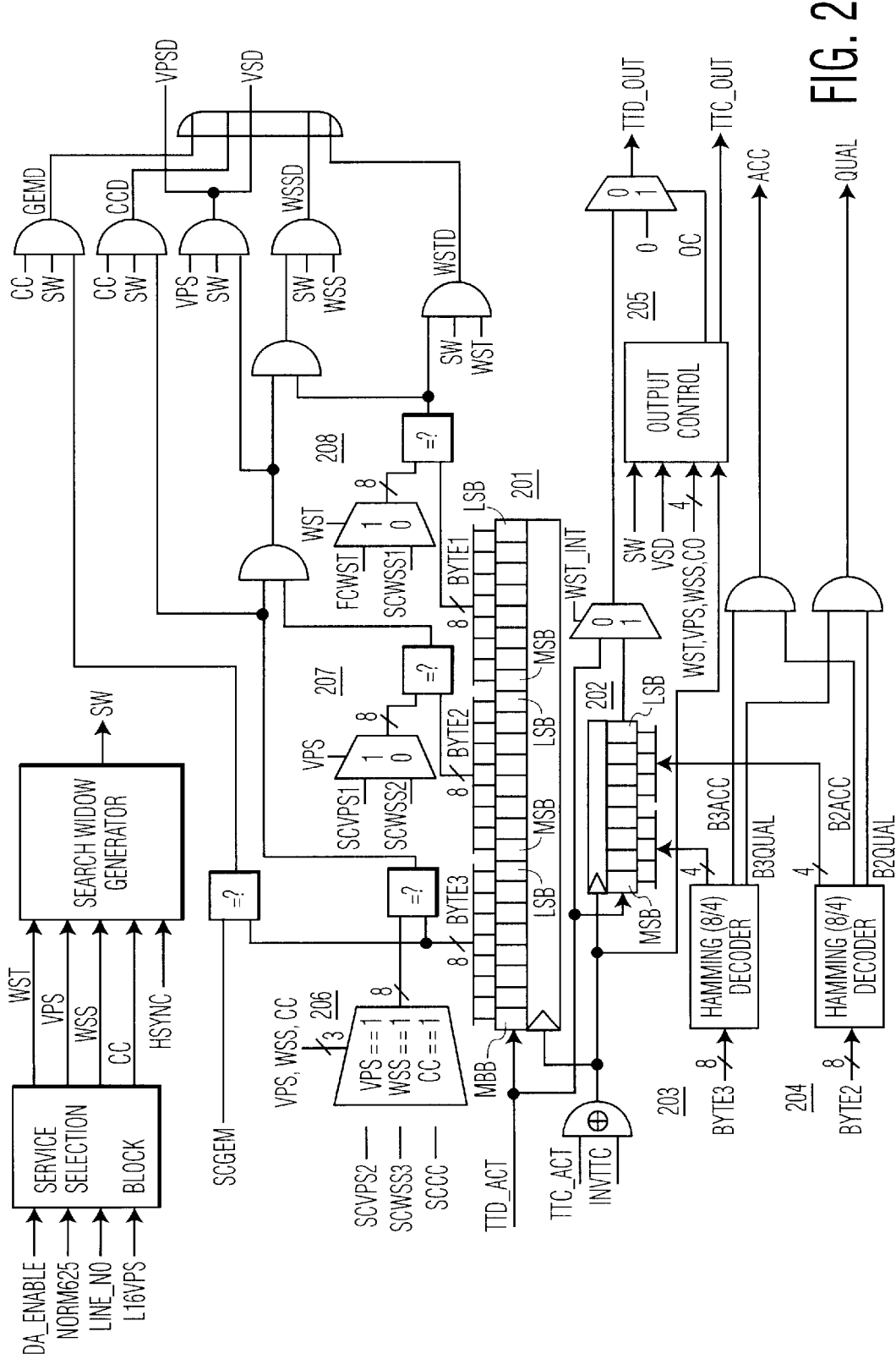

FIG. 2 shows a block diagram of the decoder. Main part of the decoder is a register 201 having 24 cells for storing 3 times 8 bit of data. Each of the three bytes are connected with logical devices, as shown in the figure, in order to compare the content of the cells with given start codes. Start of the register 202 is byte3, followed by byte2 and byte1. In addition, a second 8 bit register 202 is connected in parallel to the register 201. The content of byte3 is also fed to a Hamming (8/4) decoder 203 and of byte2 to a Hamming (8/4) decoder 204. Each decoder output of 4 bits is fed to the assigned 4 bits of the register 202, respectively.

The decoder block receives either the internal or the external data and clock signals. The decoder can be enabled or disabled by the microprocessor via the signal DA_ENABLE. The task of this block is the detection of valid data in the incoming TTD_ACT stream by scanning the stream for the occurance of the framing codes. The TTD_ACT signal is processed with the clock signal TTC_NORM, but the circuits are operating with the system clock CLK of 18 MHz. The clock frequency is specific for the services and takes values of 6.9375 MHz for World System Teletext WST, 5.0 MHz for Video Programming System VPS and Wide Screen Signal WSS and 1.007 MHz for Closed-Caption CC and Gemstar. TTC_NORM is directly derived from TTC_ACT, which may be inverted with respect to an externally connected slicer of a fallback solution. According to the signals LINE_NO, NORM625 and L16VPS, a service selection block determines what kind of framing code is looked for. Within the active interval of a service specific timing signal SW, generated by the search window generator from the HSYNC signal, up to 3 bytes are scanned for the appropriate framing code.

These 3 bytes are dedicated to the start code of a WSS line that contains 24 elements based on 5 MHz which is the frequency of the data clock TTC_NORM in this case. When the start code is detected during the active search window, the activated signal VSD (Valid Service Detected) starts the data transmission to the VBI buffer which is managed by the output control block.

In the case of a VPS line, only 2 bytes are compared to the start code consisting of the two bytes VPSSC1 and VPSSC2 based on 5 MHz. These bytes must be byte2 and byte3 to be able to transfer the subsequent data bytes to the VBI buffer. Beside the VSD signal, another signal VPSD (VPS Detected) is exported to a microprocessor register to indicate the reception of VPS data in VBI line no. 16.

In the case of a Closed-Caption or Gemstar line, only 1 byte is simultaneously compared to both start codes based on 1007 kHz. This byte must be byte3 to be able to transfer the subsequent data bytes to the VBI buffer.

In the case of a WST line, again only one byte has to be compared to the framing code based on 6.9375 MHz. The first two bytes of every WST line following the framing code are Hamming-(8/4) encoded. Due to this fact, the framing code comparison is performed in byte1. Byte2 and byte3 are then the encoded bytes. For performance reasons, these bytes can then be decoded in hardware and the result is loaded in parallel to a 8 bit FIFO. When the framing code is detected, the WST data is transferred to the VBI buffer through this FIFO.

| Framing and start codes | |
| --- | --- |
| constant name | value |
| FCWST | 27h, configurable via I²C bus |
| SCVPS1 | 51h, configurable via I²C bus |
| SCVPS2 | 99h, configurable via I²C bus |
| SCWSS1 | 78h, configurable via I²C bus |
| SCWSS2 | 3Ch, configurable via I²C bus |
| SCWSS3 | F8h, configurable via I²C bus |
| SCCC | 43h, configurable via I²C bus |
| SCGEM | EDh, configurable via I²C bus |

The decoder block preferably does not perform a bi-phase check for the VPS and WSS data. All elements of a data bit are transferred to the VBI buffer. Due to extended error correction possibilities, the bi-phase checks will be done in software.

Figure 3:
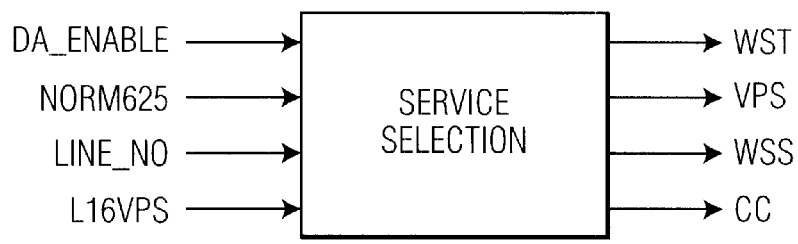

FIG. 3 shows a service selection block decoder. The service selection block receives signals DA_ENABLE, NORM625, Line-Number LINE_NO and signal L16VPS according to the used standard. As output signal the service selection block holds ready at most one signal of WST, VPS, WSS and CC.

Via the service selection block, the microprocessor can control the type of slicing for the specific video lines. During normal operation, the signals generated by the microprocessor DA_ENABLE, NORM625 remain unchanged. Only L16VPS may be altered because of errornous slicing in line 16. The control signal LINE_NO is generated by a separate instance inside the IC. During a VBI, at most one signal of WST, VPS, WSS and CC is active, depending on the specific line and video norm the IC is processing.

Figure 4:

FIG. 4 shows a search window generator. Its input is connected to the output of the service selection block. The search window generator is triggered by the HSYNC signal and provides a search window for the actual selected service WST, VPS, WSS or CC.

Figure 5:
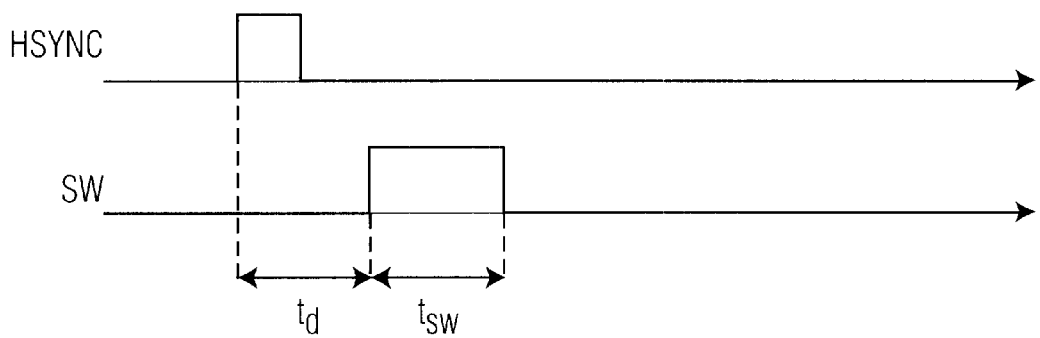

FIG. 5 shows the timing of the generated search window. If neither WST nor VPS, WSS or CC is selected, the signal SW remains inactive.

A valid framing or start code can only be detected during the active interval of the search window. The start of the search window depends on the signal delay of the internally or externally connected slicer, respectively. Hence, there is a difference due to the status of the signal source selection. The search window length results from the sum of the variation of the specified data starting time and the variation of the signal delay due to actual equalizer conditions. The optimal search window position is one matter of testing, the window positions $t_d$ and durations $t_{sw}$ of all services are configurable via the I²C bus registers SWS'xx' and SWD'xx' where 'xx' stands for the different services. If a valid framing or start code is detected during the active search window, the window is reset with the next transition of the data clock TTC_NORM.

Figure 6:
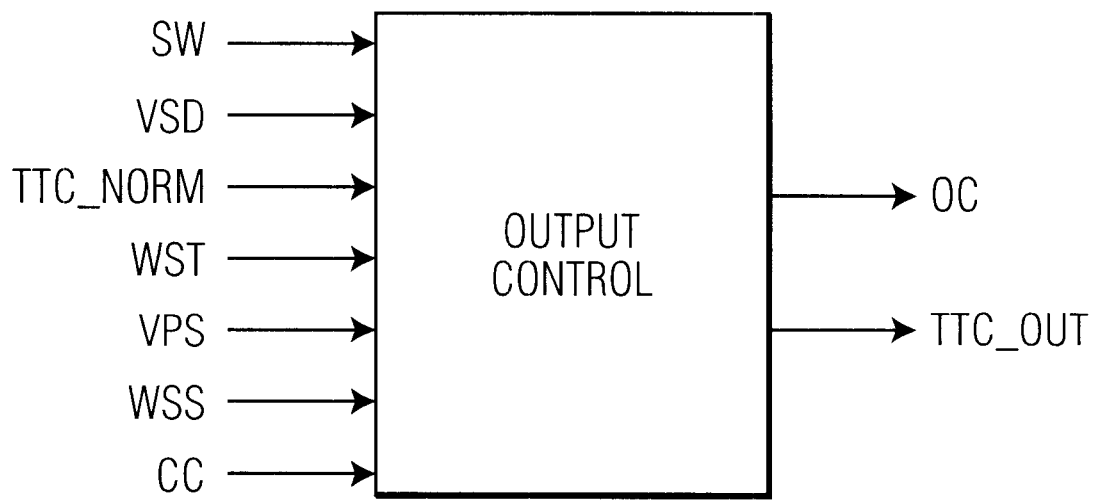

FIG. 6 shows an output control block that controls the output signals to the VBI buffer: The behaviour of this block is specified by the following truth table:

| input | | | | | | output | | |
|---|---|---|---|---|---|---|---|---|
| SW | VSD | WST | VPS | WSS | CC | TTC_OUT | OC | comment |
| 0 | 0 | | | * | | 0 | 1 | waiting for search window |
| 1 | 0 | | | * | | 0 | 1 | search window started |
| — | 0 | | | * | | 328x | 1 | search window ended without data, resetting the VBI buffer line |
| 1 | 1 | 1 | 0 | 0 | 0 | 328x | 0 | transfering WST data |
| 1 | 1 | 0 | 1 | 0 | 0 | 208x | 0 | transfering VPS data |
| | | | | | | 120x | 1 | |
| 1 | 1 | 0 | 0 | 1 | 0 | 84x | 0 | transfering WSS data |
| | | | | | | 244x | 1 | |
| 1 | 1 | 0 | 0 | 0 | 1 | 32x | 0 | transfering CC or Gemstar data |
| | | | | | | 296x | 1 | |

The data in the TTC_OUT column means that the signal stays either in logical "low" level or allows the specified number of TTC_NORM ticks to pass to TTC_OUT if OC is active. If OC is inactive, the specified number of system clocks (18 MHz) are allowed to pass to TTC_OUT. In every transfer cycle, the complete VBI buffer line is written (328 bit) in order to transfer valid data or "0", respectively. While this transfer is taking place, the output control is unsensitive for any input signal change.

Due to frequency relations for Closed-Caption and Gemstar, every data bit of a Closed-Caption line is represented by a series of 2 bit in the VBI buffer (e. g. a "0" results in "00"). Every bit of a Gemstar line is represented by one bit. Due to the amount of data in a WST line, the VBI buffer line length has not to be increased for this. This "bit extension" may be used for error checks done in software.

Figure 7:
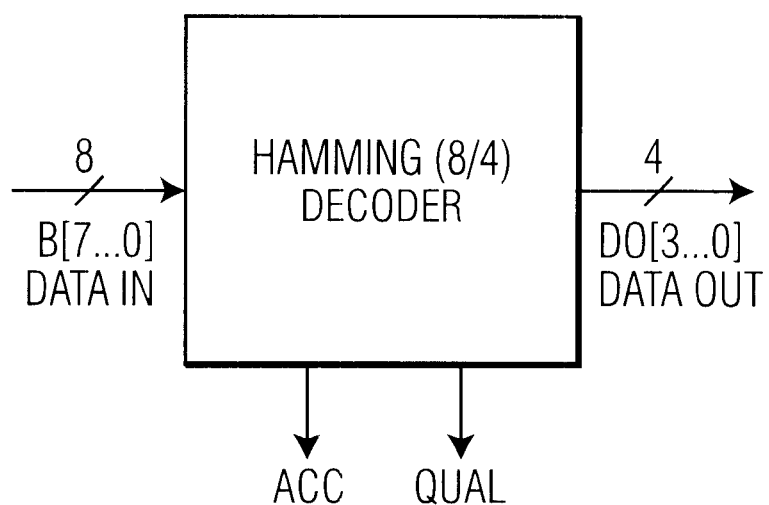

FIG. 7 shows the Hamming (8/4) decoder block that contains only combinatorial logic.

The behaviour of this block is specified by the following truth tables:

| intermediate signal | equation |
|---|---|
| A = | $b_7 \oplus b_5 \oplus b_1 \oplus b_c$ |
| B = | $b_7 \oplus b_3 \oplus b_2 \oplus b_1$ |
| C = | $b_5 \oplus b_4 \oplus b_3 \oplus b_1$ |
| D = | $b_7 \oplus b_6 \oplus b_5 \oplus b_4 \oplus b_3 \oplus b_2 \oplus b_1 \oplus b_0$ |

| intermediate signals | | | | outputs | | | | | | comment | |
|---|---|---|---|---|---|---|---|---|---|---|---|
| A | B | C | D | DO3 | DO2 | DO1 | DO0 | ACC | QUAL | handling | interpretation |
| 0 | 0 | 0 | 0 | $b_7$ | $b_5$ | $b_3$ | $!b_1$ | 1 | 0 | corrected | $b_1$ erroneous |
| 0 | 0 | 1 | 0 | $!b_7$ | $b_5$ | $b_3$ | $b_1$ | 1 | 0 | corrected | $b_7$ erroneous |
| 0 | 1 | 0 | 0 | $b_7$ | $!b_5$ | $b_3$ | $b_1$ | 1 | 0 | corrected | $b_5$ erroneous |
| 0 | 1 | 1 | 0 | $b_7$ | $b_5$ | $b_3$ | $b_1$ | 1 | 0 | accepted | $b_0$ erroneous |
| 1 | 0 | 0 | 0 | $b_7$ | $b_5$ | $!b_3$ | $b_1$ | 1 | 0 | corrected | $b_3$ erroneous |
| 1 | 0 | 1 | 0 | $b_7$ | $b_5$ | $b_3$ | $b_1$ | 1 | 0 | accepted | $b_2$ erroneous |
| 1 | 1 | 0 | 0 | $b_7$ | $b_5$ | $b_3$ | $b_1$ | 1 | 0 | accepted | $b_4$ erroneous |
| 1 | 1 | 1 | 0 | $b_7$ | $b_5$ | $b_3$ | $b_1$ | 1 | 0 | accepted | $b_6$ erroneous |
| 1 | 1 | 1 | 1 | $b_7$ | $b_5$ | $b_3$ | $b_1$ | 1 | 1 | accepted | no error |
| other cases | | | 1 | | | | | 0 | 0 | rejected | more than one error |

Besides the four data output bits, it provides an acceptance signal ACC and a signal QUAL which is an indicator for the transmission quality.

The VBI address generator determines where the sliced data of a video line has to be stored. Each video line from no. 6 to no. 23 and from no. 318 to no. 335 has a dedicated 41 byte area in the VBI buffer. In addition, the status of the actually received line—acceptance and quality for WST lines—is stored for every VBI buffer line. According to the inputs of LINE_NO, the signal LINE_SELECT takes values between 0 and 17. The transitions of the output with respect to the input changes is delayed because of the data processing which may not be completely done at the end of a video line. The output does actually change with the next activated search window. In addition, the generator performs the interrupt handling.

What is claimed is:

1. Method for acquisition of multistandard video data comprising the steps of:

loading an incoming data stream is loaded into a first memory;

performing a parallel search for different start codes on the data stream containing for different services different framing code, when service in an actual video line is not specified; and looking for start codes which are changeable by configuration.

2. Method according to claim 1, further comprising the step of enabling or disabling a decoder by a microprocessor via an enable signal.

3. Method according to claim 1, further comprising the step of adapting a clock frequency of the decoder to a frequency of different start codes.

4. Method according to claim 1, further comprising the step of using a service selection block to determine what kind of framing code is looked for based on the line number of a given input signal, a used standard of that input signal and the availability of a certain code in a specific line of that input signal.

5. Method according to claim 1, further comprising the step of scanning up to 3 bytes for an appropriate framing code within an active interval of a service specific timing signal, generated by a search window generator from a horizontal synchron signal.

6. Method according to claim 5, wherein 3 bytes are dedicated to the framing code of a line containing a first signal that contains 24 elements based on 5 MHz, in the case of a line containing a second signal, only 2 bytes are compared to the start code consisting of the two bytes based on 5 MHz, in the case of a line containing a third signal only 1 byte is simultaneously compared to both start codes based on 1007 kHz, in the case of a line containing a forth signal, again only one byte has to be compared to the framing code based on 6.9375 MHz, and when the start code is detected during the active search window, the activated signal starts the data transmission to the buffer which is managed by a output control block.

7. Method according to claim 6, wherein in the case of a line containing the second signal beside the activated signal, another signal is exported to a microprocessor register to indicate the reception of that data in a certain line.

8. Method according to claim 6, further comprising the step of transferring the data to the buffer through said second memory in the case of a line containing the fourth signal, two bytes following the framing code of a fourth signal are decoded, the result is loaded in parallel to a second memory, and when the framing code of the fourth signal is detected.

9. Apparatus for acquisition of multistandard video data, including:

means for loading an incoming data stream into a first memory;

means for performing a parallel search for different start codes on the data stream containing for different services different framing codes when service in actual video line is not specified; and means for looking for start codes changeable by configuration.

10. Apparatus according to claim 9, including additional means for decoding and storing said incoming data stream.

* * * * *